United States Patent
Wade et al.

(10) Patent No.: US 9,183,130 B2
(45) Date of Patent: *Nov. 10, 2015

(54) DATA CONTROL SYSTEM FOR VIRTUAL ENVIRONMENT

(71) Applicant: Quantum Corporation, San Jose, CA (US)

(72) Inventors: Gregory L. Wade, San Jose, CA (US); J. Mitchell Haile, Somerville, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,964

(22) Filed: Apr. 19, 2014

(65) Prior Publication Data

US 2014/0229691 A1   Aug. 14, 2014

Related U.S. Application Data

(63) Continuation of application No. 13/406,333, filed on Feb. 27, 2012, now Pat. No. 8,707,005.

(60) Provisional application No. 61/446,866, filed on Feb. 25, 2011, provisional application No. 61/476,499, filed on Apr. 18, 2011, provisional application No. 61/478,497, filed on Apr. 23, 2011.

(51) Int. Cl.
| | |
|---|---|
| *G06F 12/02* | (2006.01) |
| *G06F 3/06* | (2006.01) |
| *G06F 9/455* | (2006.01) |
| *G06F 12/12* | (2006.01) |

(52) U.S. Cl.
CPC .............. *G06F 12/023* (2013.01); *G06F 3/061* (2013.01); *G06F 3/064* (2013.01); *G06F 3/0664* (2013.01); *G06F 3/0671* (2013.01); *G06F 9/45558* (2013.01); *G06F 12/121* (2013.01); *G06F 2009/45579* (2013.01)

(58) Field of Classification Search
CPC .................................................... G06F 9/45558
USPC ........................................................ 711/159
See application file for complete search history.

(56) References Cited

U.S. PATENT DOCUMENTS

| | | |
|---|---|---|
| 7,447,854 B1 | 11/2008 | Cannon |
| 7,743,028 B1 | 6/2010 | Stringham et al. |
| 2002/0091670 A1 | 7/2002 | Hitz et al. |
| 2008/0104353 A1 | 5/2008 | Madisetti |
| 2008/0134196 A1 | 6/2008 | Madriles et al. |
| 2009/0240904 A1 | 9/2009 | Austruy et al. |

*Primary Examiner* — Cheng-Yuan Tseng
*Assistant Examiner* — Zubair Ahmed

(57) ABSTRACT

A data control system comprises a communication interface, a processing system, and a storage system. The communication interface is configured to receive a request to retrieve data from a primary storage volume that includes a secondary storage volume. The storage system is configured to store the primary storage volume that includes the secondary storage volume. The processing system is configured to identify changed segments of a plurality of segments in the primary storage volume and identify allocated segments of the changed segments. The communication interface is further configured to transfer the allocated segments in response to the request.

20 Claims, 13 Drawing Sheets

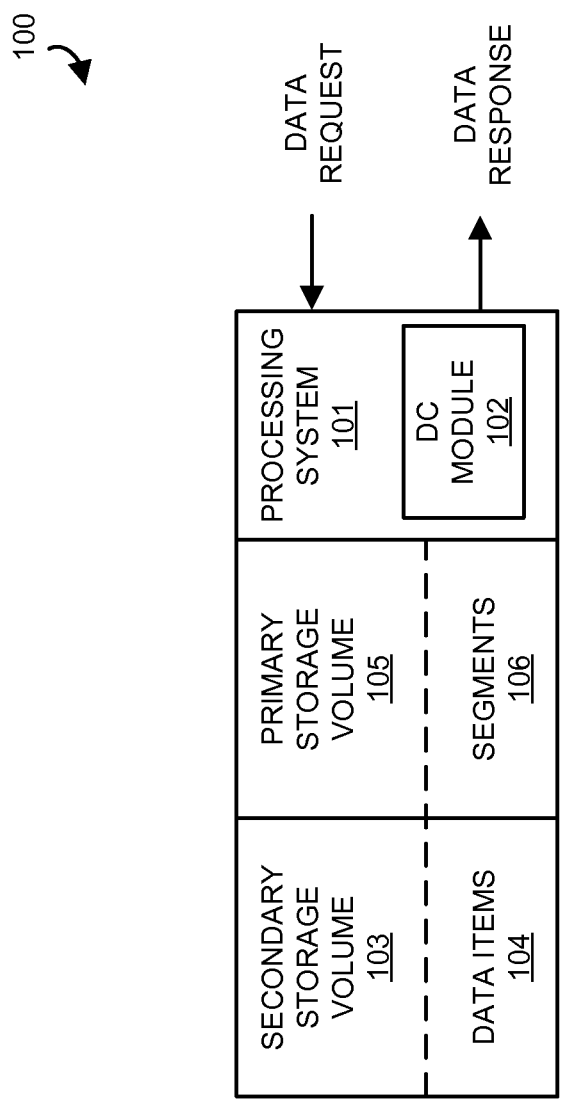

DATA CONTROL SYSTEM FOR VIRTUAL ENVIRONMENT

RELATED APPLICATIONS

This application is a continuation of U.S. Pat. No. 8,707,005, entitled "DATA CONTROL SYSTEMS FOR VIRTUAL ENVIRONMENTS," filed on Feb. 27, 2012; which is related to and claims priority to U.S. Provisional Patent Application No. 61/446,866 entitled "DATA CONTROL SYSTEM FOR VIRTUAL ENVIRONMENT" filed on Feb. 25, 2011, U.S. Provisional Patent Application No. 61/476,499 entitled "DATA CONTROL SYSTEM FOR VIRTUAL ENVIRONMENT" filed on Apr. 18, 2011, and U.S. Provisional Patent Application No. 61/478,497 entitled "DATA CONTROL SYSTEM FOR VIRTUAL ENVIRONMENT" filed on Apr. 23, 2011, which are all hereby incorporated by reference in their entirety.

TECHNICAL BACKGROUND

In the field of computer hardware and software technology, a virtual machine is a software implementation of a machine (computer) that executes program instructions like a real machine. Virtual machine technology allows for the sharing of, between multiple virtual machines, the physical resources underlying the virtual machines.

In virtual machine environments, a hypervisor running on a host hardware system creates a virtual system on which a guest operating system may execute. The virtual system includes a virtual storage volume on which the guest operating system stores its data. For example, the hypervisor may simulate a hard disk for the guest operating system that the hypervisor stores as a virtual disk file on the host system. Some hypervisors continually track and record changes to the virtual disk file in a changed block list.

A virtual storage volume within a virtual machine contains data items that need to be accessed and scanned. In most cases, accessing the underlying contents of a storage volume can be very resource-intensive, reducing the performance of a virtual machine and other operations within a virtual machine environment.

OVERVIEW

Disclosed is a data control system, a method of operating a data control system, and one or more computer-readable storage media that, when executed by the data control system, direct the data control system to operate as described herein.

In an embodiment, a method comprises receiving a request to retrieve data from a primary storage volume that includes a secondary storage volume, identifying changed segments of a plurality of segments in the primary storage volume, identifying allocated segments of the changed segments based on an allocation status of a plurality of data items contained in the secondary storage volume, wherein the plurality of data items correspond to the changed segments, and transferring the allocated segments in response to the request.

In some embodiments, the method further comprises generating a list of qualified blocks based on the allocated segments of the changed segments identified in the primary storage volume.

In some embodiments, the method further comprises reading a plurality of data blocks from the primary storage volume based on the list of qualified blocks.

In some embodiments, the primary storage volume comprises a plurality of blocks corresponding to a plurality of data items in a secondary storage volume within the primary storage volume.

In some embodiments, the method further comprises, in response to the request to retrieve the data from the primary storage volume, determining a subset of the plurality of data items that are not live based on the allocated segments of the changed segments identified in the primary storage volume, and executing an operation on the subset of the data items to reduce an amount of the plurality of blocks involved in retrieving the data.

In some embodiments, executing the operation on the subset of the data items to reduce the amount of the plurality of blocks involved in retrieving the data comprises deleting each data item of the subset of the data items.

In some embodiments, the method further comprises flushing changes to the secondary storage volume after deleting each data item of the subset of the data items.

In some embodiments, the primary storage volume includes a secondary storage volume stored thereon, and identifying the allocated segments of the changed segments comprises identifying the allocated segments of the changed segments based on an allocation status of a plurality of data items contained in the secondary storage volume, wherein the plurality of data items correspond to the changed segments.

In another embodiment, a data control system comprises a communication interface, a processing system, and a storage system. The communication interface is configured to receive a request to retrieve data from a primary storage volume that includes a secondary storage volume. The storage system is configured to store the primary storage volume that includes the secondary storage volume. The processing system is configured to identify changed segments of a plurality of segments in the primary storage volume and identify allocated segments of the changed segments. The communication interface is further configured to transfer the allocated segments in response to the request.

In another embodiment, one or more computer-readable storage media have program instructions stored thereon for operating a data control system. The program instructions, when executed by the data control system, direct the data control system to receive a request to retrieve data from a primary storage volume. The program instructions further direct the data control system to identify changed segments of a plurality of segments in the primary storage volume, and to identify allocated segments of the changed segments. The program instructions further direct the data control system to transfer the allocated segments in response to the request.

BRIEF DESCRIPTION OF THE DRAWINGS

FIG. 1 illustrates a data control system.

DETAILED DESCRIPTION

Figure 2A:
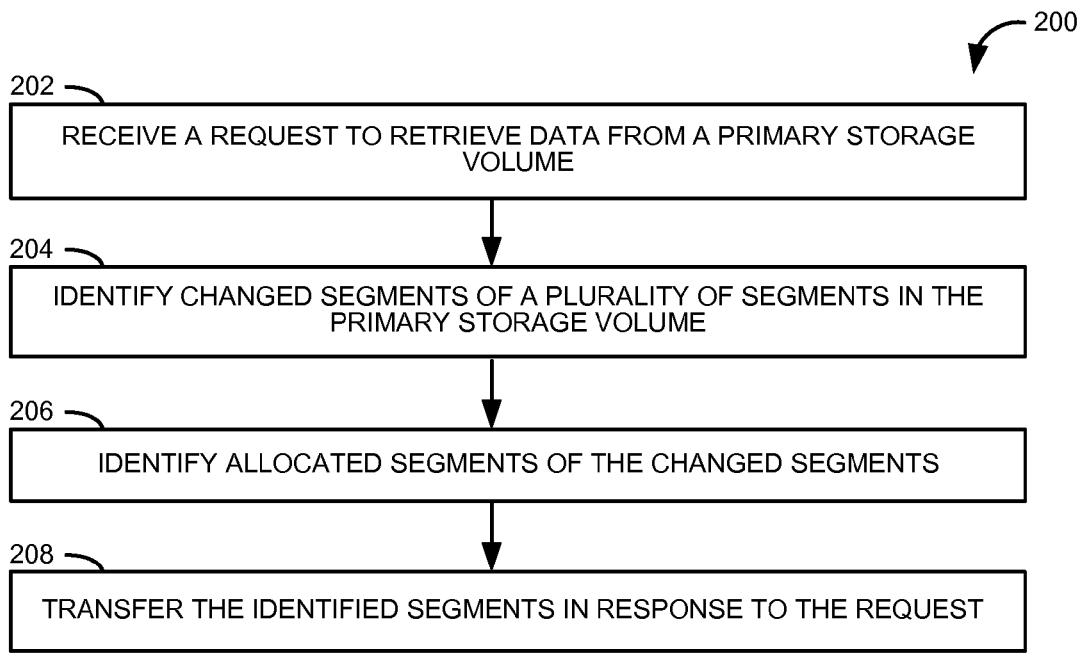
FIGS. 2A and 2B illustrate operations of a data control system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Described herein are techniques for reducing storage I/O when performing maintenance tasks such as backup, replication, or migration of virtual machines. By leveraging these methods, data systems can alleviate unnecessary reads from an underlying or primary storage volume and read only the segments required to perform the required maintenance tasks.

In particular, the systems and methods disclosed herein identify changed and live segments. The changed segments are determined using a changed block list that is typically managed by a hypervisor. The corresponding live segments are determined by identifying corresponding parts of the virtual machine disk file and determining whether those corresponding parts are live. This task is typically accomplished by reading file system metadata from the Guest OS running on the virtual machine. Parts of the virtual machine disk file that are live are those parts that are in-use and not redundant. In this manner, the number of segments read from the primary storage volume is limited to those segments that have changed and are live.

FIG. 1 illustrates data control system 100 according to an example whereby data control (DC) module 102 is implemented in order to identify segments in a primary storage volume. Data control system 100 includes processing system 101, DC module 102, secondary storage volume 103, and primary storage volume 105.

Processing system 101 comprises any system or collection of systems capable of executing DC module 102 to identify segments in primary storage volume 105. Processing system 101 may be a microprocessor, an application specific integrated circuit, a general purpose computer, a server computer, or any combination or variation thereof. DC module 102 may be program instructions executable by processing system 101.

Primary and secondary storage volumes 105 and 103, respectively, may be any storage volumes capable of storing a volume of data. Primary storage volume 105 comprises segments 106. Secondary storage volume 103 comprises data items 104. A data item may be, for example, a file. Data items 104 comprise the volume of data in secondary storage volume 103. Segments 106 comprise sections of a volume of data in primary storage volume 105.

Secondary storage volume 103 may be a virtual storage volume on a virtual machine and data items 104 may comprise the virtual storage contents of secondary storage volume 103. Secondary storage volume 103 is itself stored within primary storage volume 105. Primary storage volume 105 may be a virtual disk file. The virtual disk file comprises a volume of data that represents the contents of a virtual machine. Segments 106 may comprise sections of the volume of data in storage volume 105.

In operation, processing system 101 running DC module 102 and/or primary storage volume 105 track segments 106 of the data volume in storage volume 105 that have changed. Similarly, processing system 101 running DC module 102 and/or secondary storage volume 103 track whether data items 104 are live. Processing system 101 running DC module 102 then identifies and transfers those segments that are both live and have changed in response to a request to retrieve data.

FIG. 2A illustrates process 200 describing the operation of data control system 100 according to an example. To begin, one or more volumes of data are generated and stored. Processing system 101 receives a request to retrieve data from primary storage volume 105 (Step 202). Processing system 101 running DC module 102 subsequently identifies changed segments of a plurality of segments 106 in primary storage volume 105 (Step 204). Processing system 101 running DC module 102 then identifies allocated segments of the changed segments (Step 206) and transfers the identified segments in response to the request (Step 208). Each segment in primary storage volume can be changed or not changed and allocated (live) or free. Advantageously, this method provides for a way to limit the number of segments read as only those segments that have changed and are allocated are read and/or transferred.

Figure 2B:
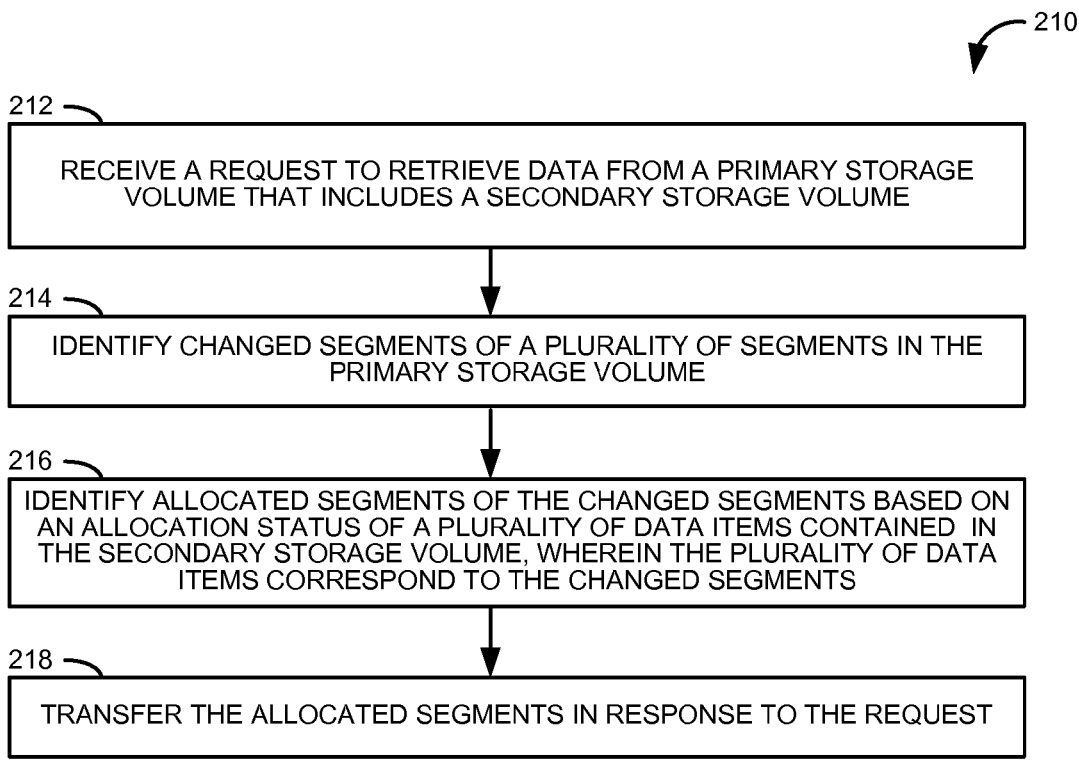

FIG. 2B illustrates process 210 describing the operation of data control system 100 according to another example. To begin, one or more volumes of data is generated and stored. Processing system 101 receives a request to retrieve data from primary storage volume 105 that includes secondary storage volume 103 (Step 212). For example, processing system 101 running DC module 102 may receive a request to retrieve data representing a virtual machine or virtual appliance. In this case, primary storage volume 105 comprises a virtual disk file which further comprises the volume of data that represents a virtual machine. Secondary storage volume 103 comprises a virtual storage volume on the virtual machine.

Processing system 101 running DC module 102 subsequently identifies changed segments of a plurality of segments 106 in primary storage volume 105 (Step 214). For example, in response to the request to retrieve the volume of data from primary storage volume 105, processing system 101 running DC module 102 obtains a change segment list from a hypervisor and processes the change segment list to identify the segments of segments 106 in primary storage volume 105 that have changed. In this case, the change segment list is obtained from and managed by a hypervisor on which the virtual machine (corresponding to the v-disk file) is running. Other elements may alternatively or additionally manage the change segment list.

Processing system 101 running DC module 102 then identifies allocated segments of the changed segments based on an allocation status of a plurality of data items contained in secondary storage volume 103, wherein the plurality of data items correspond to the changed segments (Step 216). For example, processing system 101 running DC module 102 reads the file system metadata from the Guest OS on the virtual machine to determine which parts of secondary storage volume 103 are redundant or no longer in use. More specifically, processing system 101 running DC module 102 identifies the data items of data items 104 that correspond to the changed segments and filters out those data items that are not live. The file metadata may represent the status of the data items which may be stored in a file system having any number of formats such as, for example, FAT, NTFS, HFS, UFS, ext2, ext3, ext4, VMFS, and the like.

In other examples, processing system 101 running DC module 102 reads the file system metadata from locations other than the Guest OS such as a Guest Application running on the virtual machine or another entity within the virtual machine. Moreover, in some examples, processing system 101 running DC module 102 may determine the allocation status using the hypervisor or other software on storage system 303.

By filtering out those data items that are not live (e.g., those data items that are redundant or no longer in use by the Guest O/S), processing system 101 running DC module 102 is left with those changed segments that also correspond to live data items. Lastly, processing system 102 transfers the allocated segments in response to the request (Step 218). Those skilled in the art will appreciate that the transfers, as referred to herein, are typically not literal transfers. Rather, a version of the segments may be transferred or copied. However, in some embodiments, the segments may literally be transferred.

Those skilled in art will also appreciate that data requests may be used for a variety of applications and/or data utilities. For example, a data utility may make the data request in order to backup, replicate, or migrate virtual machines. Similarly, the data utility may make the request to scan the data for viruses, to identify changed data items for computer or data forensics, for compliance needs, or in order to log system changes. It should be understood that data the request may be made by a human operator or another software application, hardware element, or the like.

Figure 3:
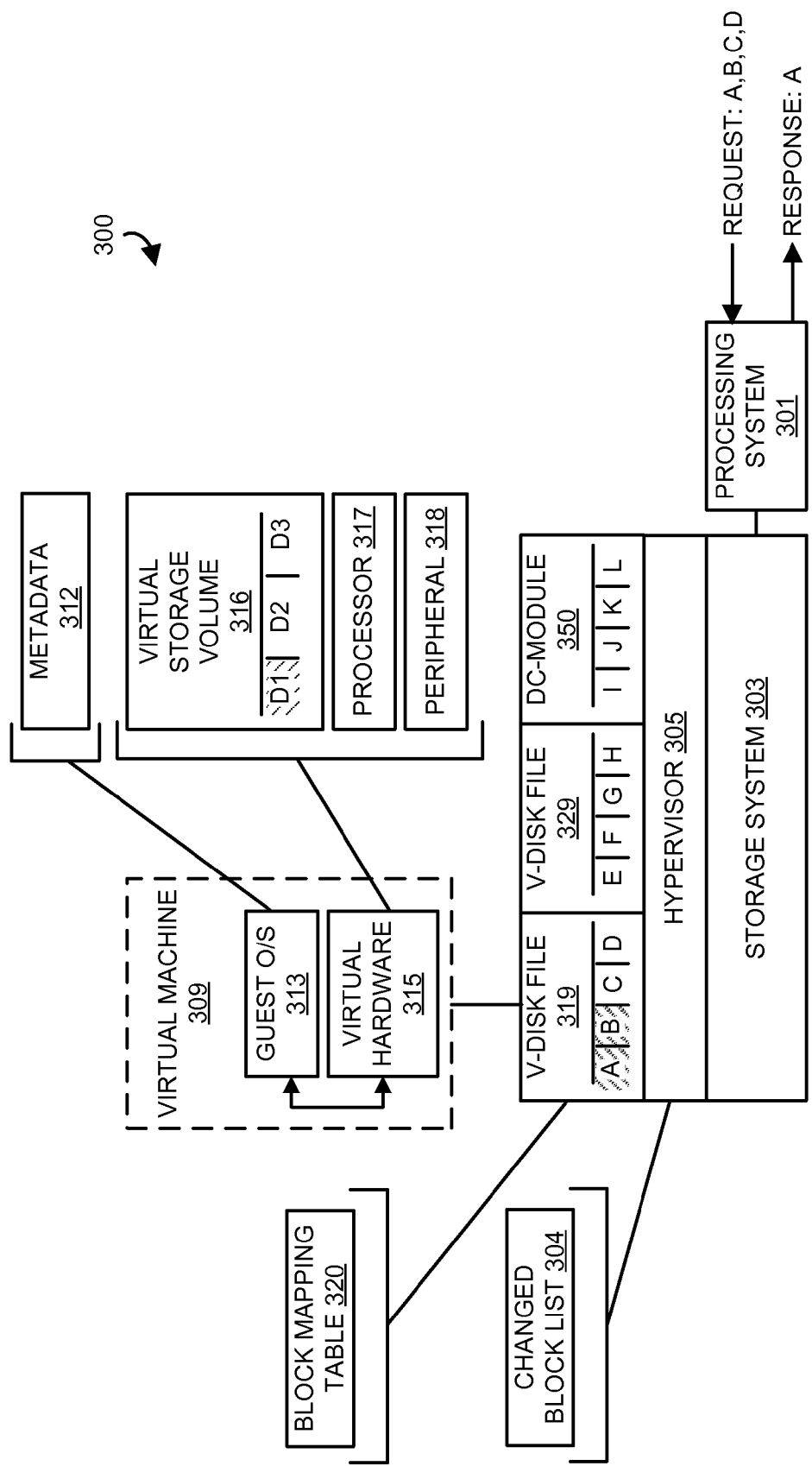
FIG. 3 illustrates a data control system in an embodiment wherein a data identification module operates to identify segments in a primary storage volume.

FIG. 3 illustrates data control system 300 in an embodiment wherein data control module 350 operates to identify segments in primary storage volume and transfer those segments. In this example, data storage system 300 includes processing system 301, and storage system 303. Hypervisor 305 runs on storage system 303. Virtual disk files 319 and 329 and DC module 350 run on hypervisor 305. As shown, DC module 350 runs on hypervisor 305, however in some embodiments, DC module 305 may run directly on storage system 303 or on another hypervisor (not shown) running on storage system 303 or another storage system (not shown).

Hypervisor 305 keeps track of those segments that have changed using a changed block list 304. In this example, segments are equivalent to blocks. The changed block list describes the blocks that have changed in virtual disk files 319 and 329. In some example, hypervisor 305 generates changed block list 304. Those skilled in the art will appreciate that changed block list 304 may alternatively or additionally be generated by any entity within virtual machine 309 (such as guest operating system 313), processing system 301, and/or storage system 303. Moreover, changed block list 304 may be generated by replication software, continuous data protection (CDP) software, or virtual disk change block tracking software running on virtual machine 309, hypervisor 305, or processing system 301.

Virtual disk files 319 and 329 may be, for example, VMWare images (.vmdk files), VirtualBox images (.vdi files), Virtual Hard Disk images (.vhd), and/or other image format files, including combinations thereof. Virtual disk files 319 and 329 include block mapping tables. Block mapping table 320 describes the storage of the data volume in virtual disk file 319. For example, block mapping table 320 may describe the correspondence between data items on virtual storage volume 316 and underlying virtual disk file 319. Block mapping table 320 is shown with more detail in FIG. 4.

As discussed, hypervisor 305 includes virtual machines represented by v-disk files 319 and 329. In particular, v-disk file 319 represents virtual machine 309. Virtual machine 309 includes guest operating system 313 and virtual hardware 315. Guest operating system 313 includes metadata 312. Virtual hardware 315 includes virtual storage volume 316, virtual processor 317, and virtual peripheral 318.

In operation, processing system 301, executing software including DC module 350, identifies and transfers live and changed segments corresponding to requested segments. As shown in this example, processing system 301 receives a request to retrieve data from virtual disk file 319. In particular, in this example, all of the segments of virtual disk file 319 are requested (i.e., segments A, B, C, and D).

Processing system 301 executing DC module 350 first identifies changed segments of the plurality of segments in the primary storage volume. In this example, the primary storage volume comprises virtual disk file 319. The changed block list 304 indicates that blocks A and B have changed.

Figure 4:
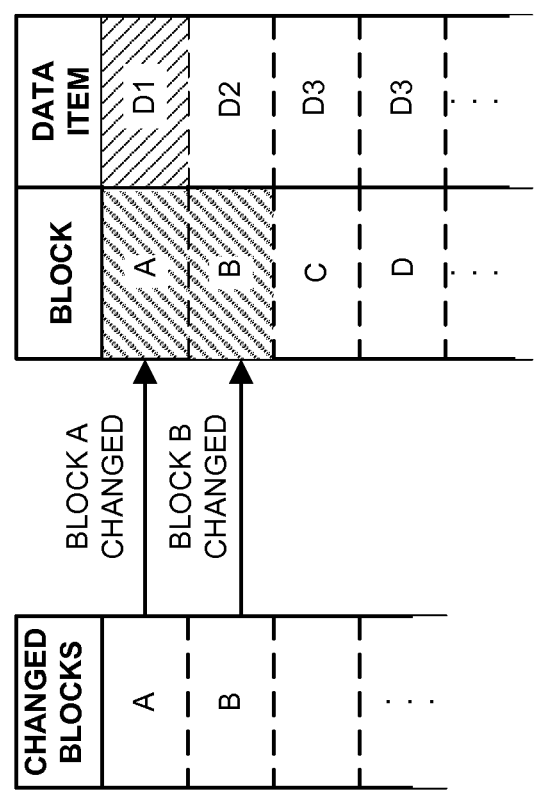
FIG. 4 illustrates a block mapping table.

Processing system 301 executing DC module 350 subsequently identifies allocated segments of the identified changed segments based on an allocation status of a plurality of data items contained in virtual storage volume 316, wherein the plurality of data items correspond to the changed segments. The block mapping table 320 and metadata 312 are accessed to accomplish this task. For example, FIG. 4 illustrates that changed block A corresponds to data item D1 and changed block B corresponds to data item D2. Metadata 320 is accessed from guest operating system 313 to determine the allocation status of data items D1 and D2. In this example, only D1 is allocated or live, and thus only segment A is both changed and allocated. Processing system 301 executing DC module 305 then transfers segment A in response to the request.

Advantageously, DC module 350 understands the multiple layers of data in a control system 300 as a group and when reading the virtual machines (segments from virtual disk representing the virtual machine data), only the data actually in use at the time of the read is transferred. This is the case regardless of whether the data block was previously in use or changed. The software reading the virtual disk, whether it be a backup agent or a replication tool, still receives a standard virtual disk-formatted data stream, but the stream has been scrubbed clean of random data. This process increases WAN throughput, compression, and/or de-duplication activities that occur after reading the virtual machine.

Figure 5:
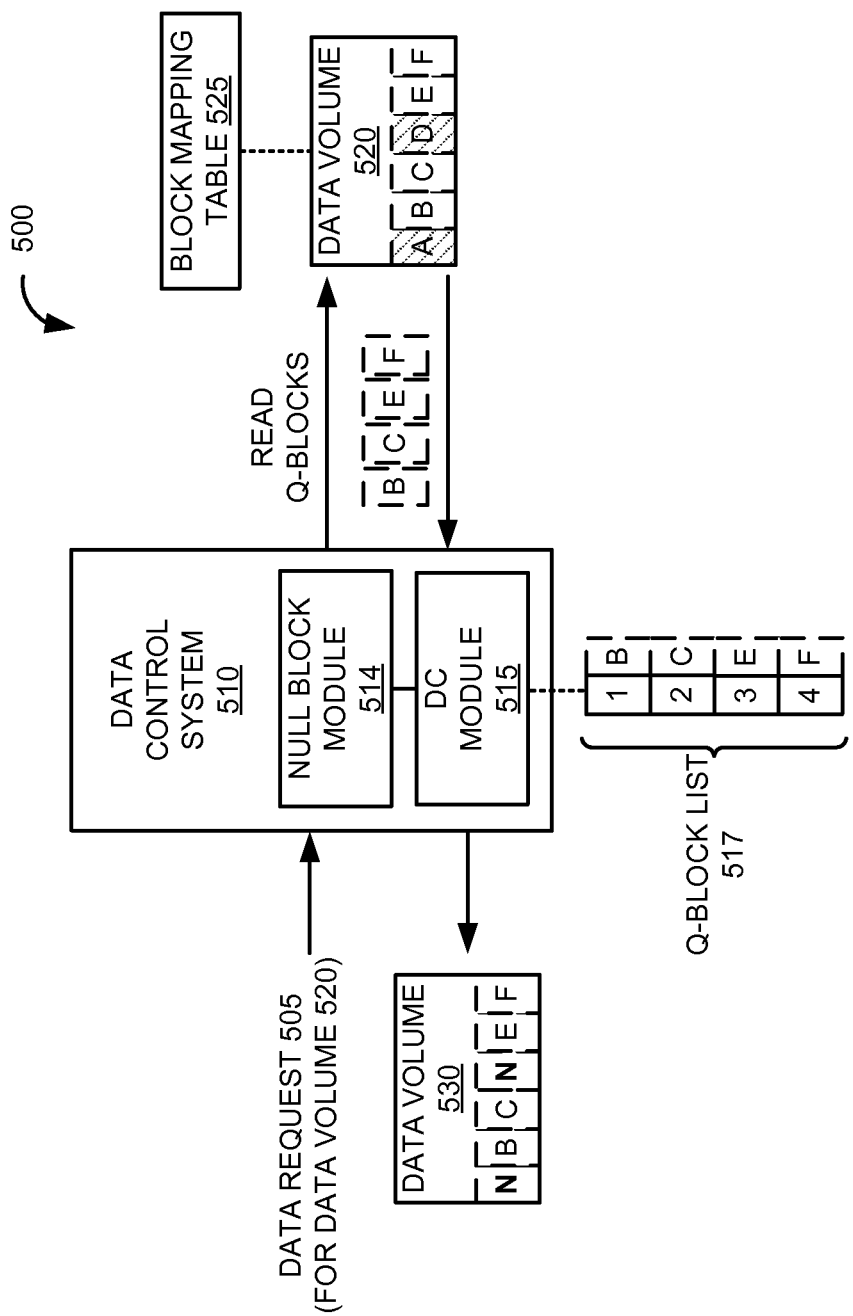
FIG. 5 illustrates a data control system in a data transport environment.
Figure 6:
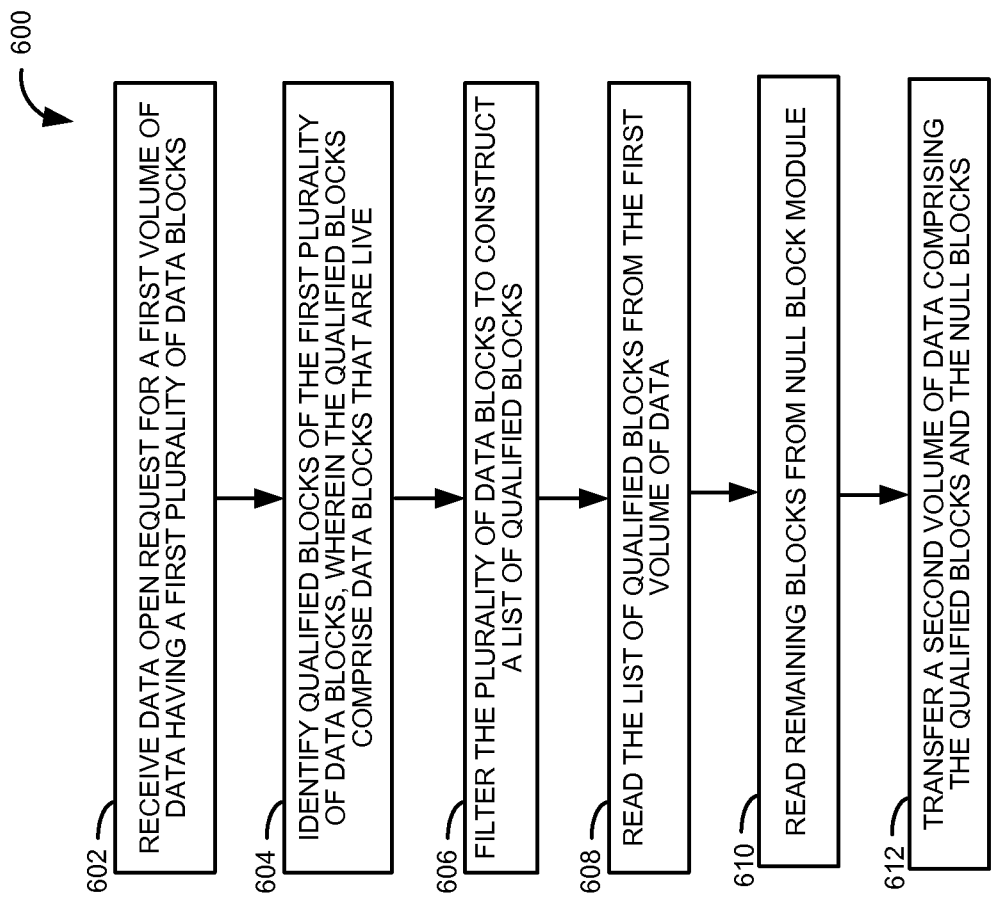
FIG. 6 illustrates an operation of a data control system in a data transport environment.
Figure 7:
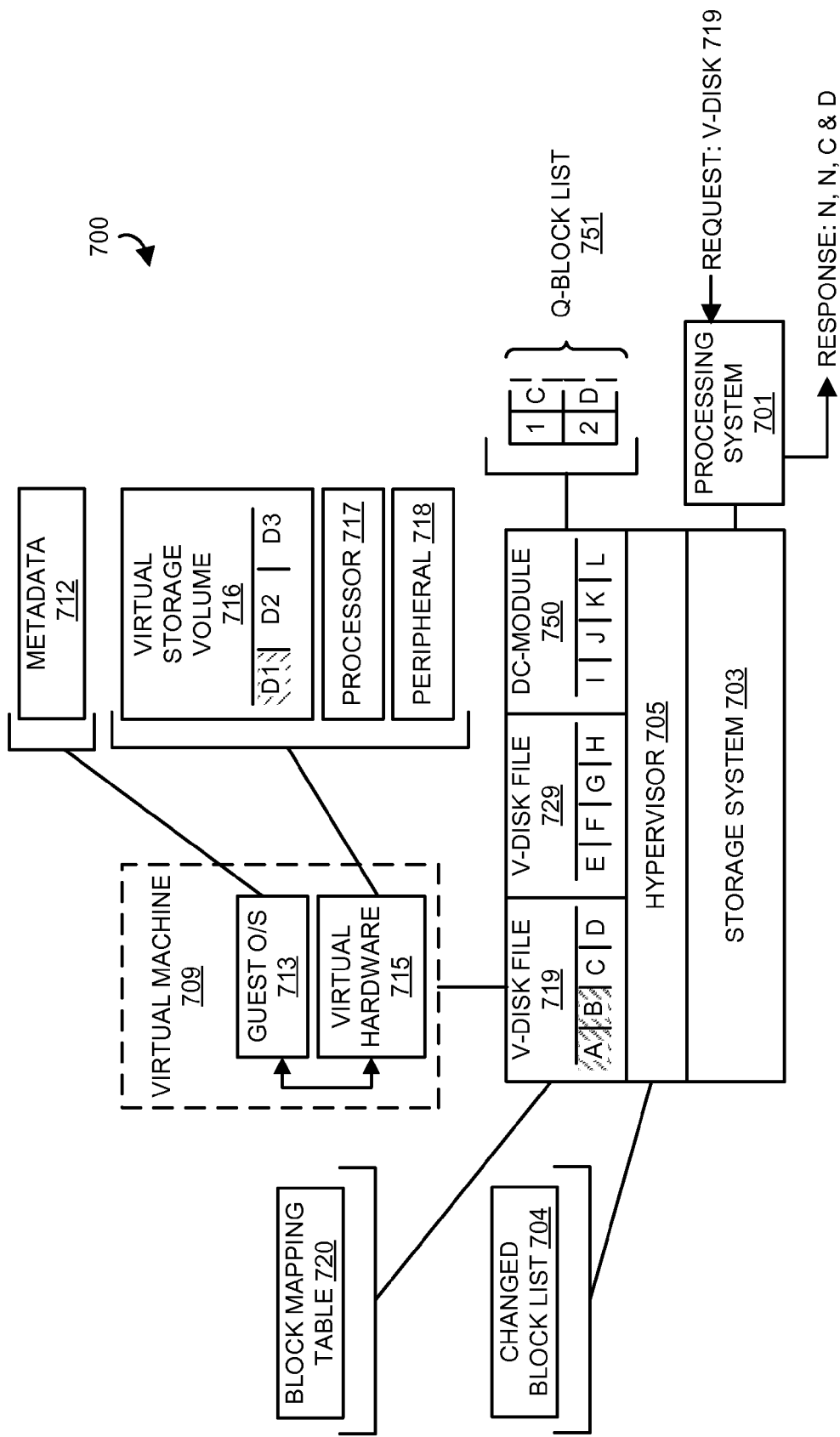
FIG. 7 illustrates a data control system in a virtual system environment.

FIGS. 5 through 7 describe techniques for reducing storage I/O when performing tasks such as backup, replication, or migration of virtual machine data. By leveraging these methods, data systems can alleviate unnecessary reads from a data volume and read only data blocks required to perform the required tasks. More specifically, qualified blocks in a data volume are identified in order to generate a qualified block list. The qualified block list identifies qualified blocks (e.g., those blocks that are "live" or allocated in the data volume). In this manner, the number of data blocks read from the data volume is limited to qualified blocks identified in the qualified block list.

FIG. 5 illustrates data control system 510 in data transport environment 500. Data transport environment 500 includes data request 505, data control system 510, data volume 520, and data volume 525. Data control system 510 includes null block module 514, DC module 515, and qualified block (Q-block) list 517. Data volume 520 includes a block mapping table 525.

Data control system 510 comprises any system or collection of systems capable of executing DC module 515 to identify qualified blocks in data volume 520 and to responsively generate a list of the identified qualified blocks. Data control system 510 may be a microprocessor, an application specific integrated circuit, a general purpose computer, a server computer, or any combination or variation thereof. DC module 515 may be program instructions executable by processing system. Null block module 514 may be, for example, a special file (or module) called "/dev/zero." The "/dev/zero" file normally resides in Unix-like operating systems. Typically, the file provides as many null characters (ASCII NUL, 0x00) as are read from it.

Data volume 520 may be any storage volume capable of storing a volume of data, wherein the volume of data comprises a plurality of data blocks. For example, data volume 520 may be a virtual disk file. Virtual disk files may be, for example, VMware images (.vmdk files), VirtualBox images (.vdi files), Virtual Hard Disk images (.vhd), and/or other image format files, including combinations thereof. In this case, the virtual disk file includes block mapping table 525.

Block mapping table 525 describes the storage of data in data volume 520 (e.g., in the virtual disk file). For example, block mapping table 525 may describe data blocks A, B, C, D, E, and F and their correspondence with data items or files. More importantly, the block mapping table may be used to identify which of the blocks are "live." As shown in FIG. 5, data volume 520 includes data blocks A, B, C, D, E, and F. Qualified blocks B, C, E, and F are those data blocks that are "live" (i.e., allocated) in data volume 520. The qualified blocks are shown without shading. Blocks A and D are not "live," and thus are shown shaded.

In operation, DC module 515 is implemented to direct data control system 510 to identify qualified blocks in a data volume in response to data request 505. For example, data request 505 may request an entire data volume 520 (i.e., each of the data blocks in data volume 520). Data control system 510 then generates Q-block list 517 identifying only the qualified blocks in data volume 520 and uses Q-block list 517 to determine which blocks to request from data volume 520. Advantageously, data volume 520 receives a request for, and returns, only the requested (or read) blocks reducing the amount of data that needs to be accessed from data volume 520.

FIG. 6 illustrates process 600 describing operation of data control system 510 in data transport environment 500. To begin, data control system 510 receives a data open request for a first volume of data having a first plurality of data blocks (Step 602). In some examples, the data open request may be a file open request. For example, data control system 510 may present itself to a data utility (not shown) over a network (LAN or WAN) as a shared disk. The data utility can then request to mount or map the drive in order to see information regarding data volume 520. When mounted or mapped, data control system 510 may provide a file system view of data volume 520 and other data volumes (not shown) to the data utility.

Data control system 510 then identifies qualified blocks of the first plurality of data blocks (604). The qualified blocks comprise data blocks that are live blocks. For example, responsive to receiving the data open request, data control system 510 may access block mapping table 525 which describes the storage of the data volume 520. Block mapping table 525 describes data blocks A, B, C, D, E, and F and their correspondence with data items or files. More importantly, the block mapping table is used to identify which of the blocks are "live." In this example, data blocks B, C, E, and F are "live" data blocks. Those skilled in the art will appreciate that identifying the liveliness of the data blocks may also require access to file system metadata in a guest O/S (discussed in more detail with respect to FIG. 13).

Data control system 510 filters the plurality of data blocks to construct a list of qualified blocks (Step 606). For example, data blocks A and D are not "live," and thus are filtered out. Once the list of qualified blocks is constructed or generated, data control system 510 reads the list of qualified blocks from the first volume of data (Step 608). In this example, data control system 510 requests or reads qualified blocks B, C, E, and F using the constructed qualified-block list 517.

Data control system 510 then reads the remaining blocks (i.e., the non-qualified blocks) from null block module 514 (Step 610). As discussed above, null block module 514 may be a "/dev/zero" file that provides as many null characters (ASCII NUL, 0x00) as are read from it. In this example, the remaining or non-qualified blocks A and D are read from /dev/zero file. Lastly, data control system 510 transfers a second volume of data comprising the qualified blocks received from data volume 520 and the null blocks provide by the null block module 514 (Step 612).

FIG. 7 illustrates an embodiment wherein the data control system is embedded in a virtual system environment 700. In this example, data control module 750 operates to identify qualified blocks in a data volume in response to a data request. Virtual system environment 700 includes processing system 701, and storage system 703. Hypervisor 705 runs on storage system 703. Virtual disk files 719 and 729 and DC module 750 run on hypervisor 705. As shown, DC module 750 runs on hypervisor 705, however in some embodiments, DC module 750 may run directly on storage system 703, on another hypervisor (not shown) running on storage system 703, and/or on another storage system (not shown). Although not shown in this example, those skilled in the art will appreciate that in some embodiments DC module 750 may run on storage systems outside of virtual system environment 700.

Hypervisor 705 keeps track of those data blocks that have changed using a changed block list 704. Changed block list 704 describes the blocks that have changed in virtual disk files 719 and 729. In some example, hypervisor 705 generates changed block list 704. Those skilled in the art will appreciate that changed block list 704 may alternatively or additionally be generated by any entity within virtual machine 709 (such as guest operating system 713), processing system 701, and/or storage system 703. Moreover, changed block list 704 may be generated by replication software, continuous data protection (CDP) software, or virtual disk change block tracking software running on virtual machine 709, hypervisor 705, or processing system 701.

Virtual disk files 719 and 729 may be, for example, VMWare images (.vmdk files), VirtualBox images (.vdi files), Virtual Hard Disk images (.vhd), and/or other image format files, including combinations thereof. Virtual disk files 719 and 729 include block mapping tables. Block mapping table 720 describes the storage of the data volume in virtual disk file 719. For example, block mapping table 720 may describe the correspondence between data items (D1, D2, and D3) on virtual storage volume 716 and underlying virtual disk file 719. More importantly, the block mapping table may be used to identify which of the blocks are "live."

As discussed, hypervisor 705 includes virtual machines represented by v-disk files 719 and 729. In particular, v-disk file 719 represents virtual machine 709. Virtual machine 709 includes guest operating system 713 and virtual hardware 715. Guest operating system 713 includes metadata 712. Virtual hardware 715 includes virtual storage volume 716, virtual processor 717, and virtual peripheral 718.

In operation, processing system 701, executing software including DC module 750, receives a request for a volume of data having a plurality of data blocks. In this example processing system 701 receives a request for v-disk 719. As shown, v-disk 719 comprises data blocks A, B, C, and D. Processing system 701 executing DC module 750 then identifies qualified blocks of the plurality of data blocks in v-disk 719. In this example, the qualified blocks are those data blocks that are live. However, in other examples, the qualified blocks may be data blocks that are both live and that have changed. Other criteria for identifying qualified blocks are also possible.

Processing system 701 executing DC module 750 subsequently filters the plurality of data blocks to construct Q-block list 751 identifying the qualified blocks to be read. In this example, Q-block list 751 includes qualified blocks C and D. Processing system 701 executing DC module 750 then reads the qualified blocks based on the Q-block list 751 from v-disk 719. As discussed, accessing the underlying contents of a storage volume (v-disk 719) can be very resource intensive, reducing the performance of a virtual machine and other operations within a virtual machine environment. Advantageously, in this example, only blocks C and D need to be read from v-disk 719.

In order to return a full v-disk, as typically requested, processing system 701, executing DC module 750, reads the remaining blocks (i.e., the non-qualified blocks) from a "/dev/zero" file that provides as many null characters (ASCII NUL, 0x00) as are read from it. In this example, the remaining or non-qualified blocks A and B are read from the /dev/zero file. Lastly, processing system 701 executing DC module 750 transfers a second v-disk (in response to the request for v-disk 719) comprising the qualified blocks received from data volume 520 and the null blocks provided by the "/dev/zero" file.

FIGS. 8 through 12 describe techniques for reducing storage I/O when performing tasks such as backup, replication, or migration of virtual machine data. By leveraging these methods, data systems can alleviate unnecessary reads from a data volume and read only data blocks required to perform the required tasks. More specifically, the number of blocks involved in a primary operation may be reduced by determining a status of each corresponding data item and executing a secondary operation on a subset of the plurality of data items. In this manner, the number of data blocks read from the data volume is limited to active (i.e., non-deleted) blocks in the primary storage volume.

Figure 8:
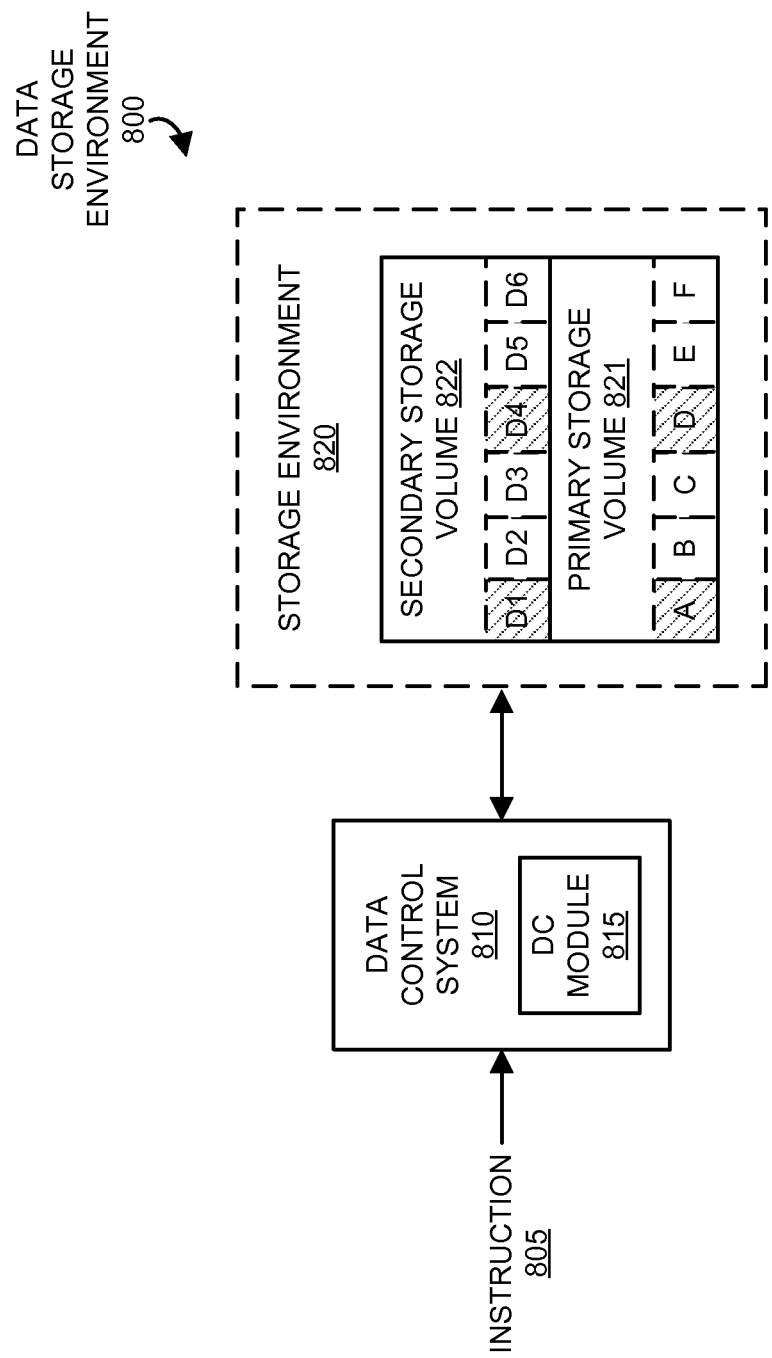
FIG. 8 illustrates a data control system in a data storage environment.

FIG. 8 illustrates data control system 810 in data storage environment 800. Data storage environment 800 includes instruction 805, data control system 810, and storage environment 820. Storage environment 820 includes primary storage volume 821 and secondary storage volume 822. Data control system 810 includes DC module 815.

Data control system 810 comprises any system or collection of systems capable of executing DC module 815 to direct data control system to operate as described herein. Data control system 810 may be a microprocessor, an application specific integrated circuit, a general purpose computer, a server computer, or any combination or variation thereof. DC module 815 may be program instructions executable by processing system.

Storage environment 820 comprises any system of collection of systems that includes one or more storage volumes. As discussed, storage environment 820 includes primary storage volume 821 and secondary storage volume 822. Primary and secondary storage volumes 821 and 822, respectively, may be any storage volumes capable of storing volumes of data. Primary storage volume 821 comprises blocks A, B, C, D, E, and F. One or more of blocks A, B, C, D, E, and F may comprise secondary storage volume 822. In this example, blocks A, B, C, D, E, and F comprise secondary storage volume 822. Secondary storage volume 822 comprises data items D1, D2, D3, D4, D5, and D6. Data items data items D1, D2, D3, D4, D5, and D6 comprise the volume of data in secondary storage volume 822. For simplicity, in this example each data item corresponds to a single block. However, those skilled in the art will appreciate that a data item may correspond to more than one block. Likewise, in some cases, multiple data blocks correspond to a single block.

A block mapping table (not shown for simplicity) may be used by storage environment 820 to describe the relationship between primary storage volume 821 and secondary storage volume 822. In this example, block A of primary storage volume 821 corresponds to data item D1 of secondary storage volume 822, block B corresponds to data item D2, and so on.

In operation, data control system 810 receives instruction 805 to perform a primary operation on primary storage volume 821 and responsively reduces the number of allocated or "live" blocks in primary storage volume 821. The reduction of blocks occurs as a result of the deletion of corresponding data items in secondary storage volume 822. For example, data items D1 and D4 are shown shaded because they represent data items that are not "live" or allocated. Unallocated data items may comprise system files such as, for example, cache files, ghost files, and swap files. Advantageously, reducing the number of allocated or "live" blocks in primary storage volume 821 may result in fewer blocks needing to read in order to complete the primary operation on primary storage volume 821.

Figure 9:
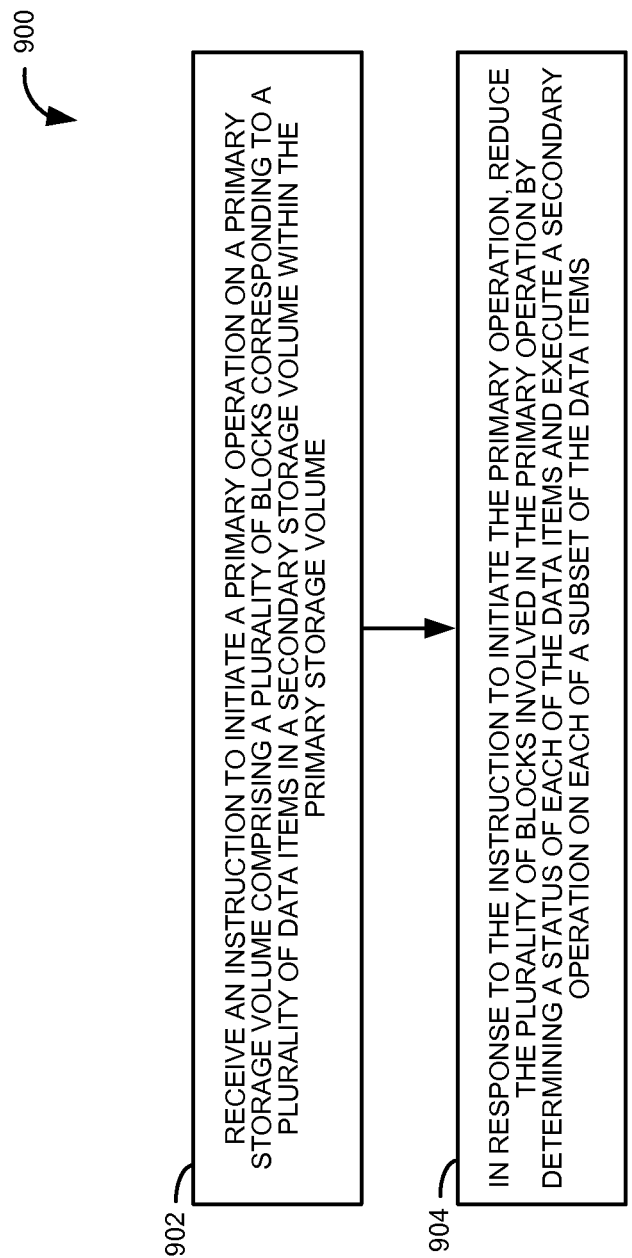
FIG. 9 illustrates an operation of a data control system in a data storage environment.

FIG. 9 illustrates process 900 describing operation of data control system 810 in data transport environment 800. To begin, data control system 810 receives instruction 805 (Step 902). In response to the instruction, DC module 815 is implemented to direct data control system 810 to initiate a primary operation on primary storage volume 821. As discussed, primary storage volume 821 comprises a plurality of blocks corresponding to a plurality of data items in secondary storage volume 822. The primary operation may be, for example, a request to read primary storage volume 821.

In response to the instruction to initiate the primary operation, DC module 815 is implemented to direct data control system 810 to reduce the plurality of blocks involved in the primary operation by determining a status of each of the plurality of data items and executing a secondary operation on each of a subset of the plurality of data items (Step 904). For example, data control system 810 may determine the liveliness status of each of the plurality of data items by accessing metadata (not shown) associated with secondary storage volume 822. The secondary operation may be, for example, an operation to delete the subset of the plurality of items that are not live or unallocated. In this example, data control system 810 directs storage environment 820 to delete data items D1 and D4 from secondary storage volume 822 resulting in the deletion of blocks A and D, respectively, from primary storage volume 821.

Figure 10:
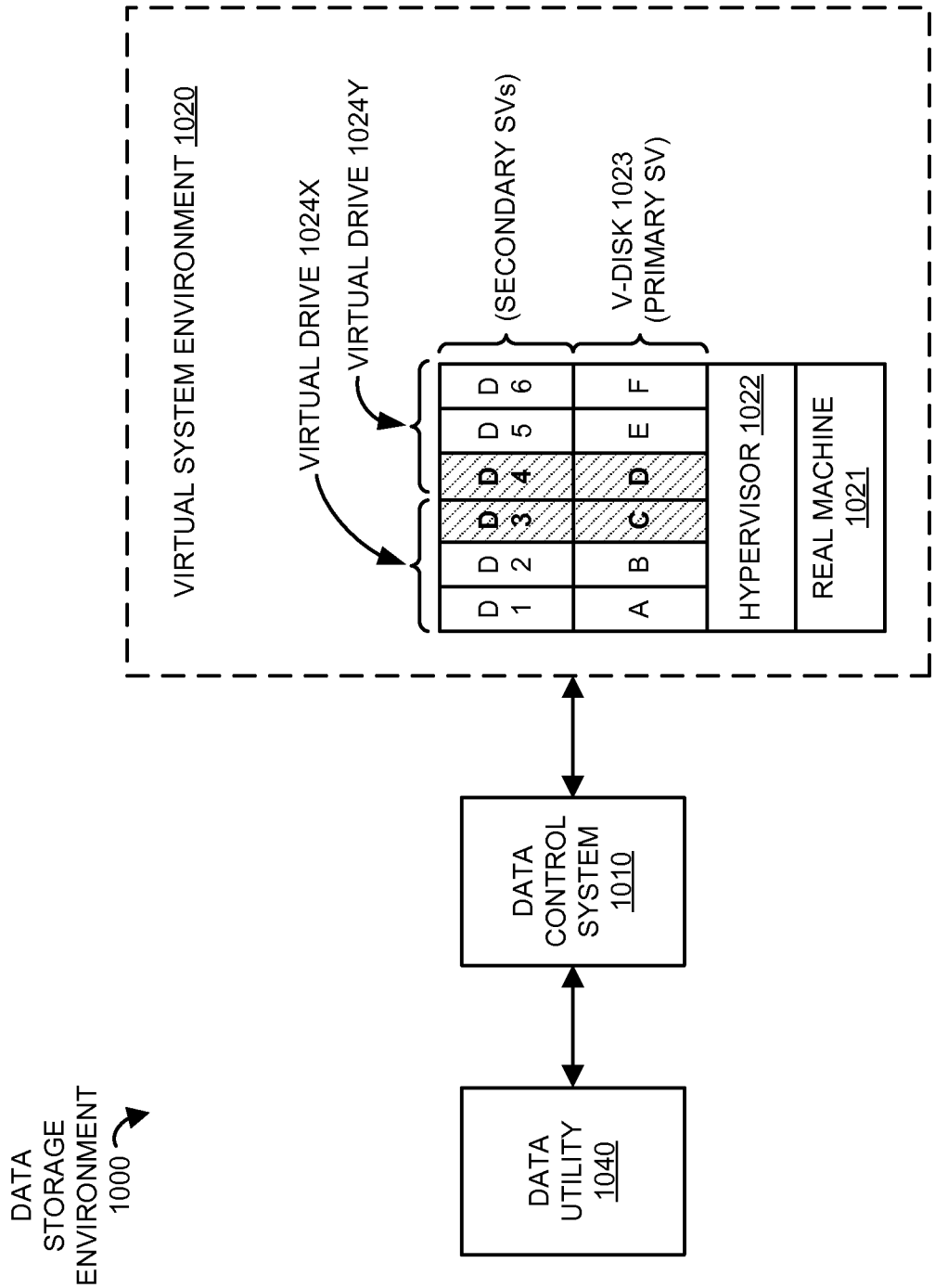
FIG. 10 illustrates a data control system in a data storage environment.

FIG. 10 illustrates data control system 1010 in data storage environment 1000 for accessing elements and/or contents of virtual system environment 1020. Data storage environment 1000 includes data control system 1010, virtual system environment 1020, and data utility 1040. Data utility 1040 is in communication with data control system 1010. Data control system 1010 is in communication with virtual system environment 1020.

Data control system 1010 comprises any system or collection of systems capable of executing a DC module (not shown) to direct data control system 1010 to operate as described herein. Data control system 1010 may be a microprocessor, an application specific integrated circuit, a general purpose computer, a server computer, or any combination or variation thereof. DC module may be program instructions executable by a processing system on data control system 1010. In this example, data identification system 1010 is shown outside virtual system environment 1020. However, those skilled in the art will appreciate that in some embodiments, data identification system 1010 may be located within virtual system environment 1020.

Virtual system environment 1020 comprises real machine 1021. Real machine 1021 may be may be any computer system, custom hardware, or other device. Real machine 1021 includes a storage system for storing software, and may retrieve and execute software from the storage system. The storage system could include a computer-readable medium such as a disk, tape, integrated circuit, server, or some other memory device, and also may be distributed among multiple memory devices. Each real machine 1021 acts as a host machine. In this example, one host machine is shown for simplicity. Those skilled in the art will appreciate that any number of host machines may be included in virtual system environment 1020. Real machine 1021 comprises hypervisor 1022. Hypervisors allow multiple operating systems to run concurrently on real machine 1021 (i.e., the host machine). In this example a single hypervisor (i.e., hypervisor 1022) is shown for simplicity. Those skilled in the art will appreciate that more hypervisors may be present on each real machine 1021.

As shown, hypervisor 1022 includes a single virtual disk file 1023 for simplicity. Those skilled in the art will appreciate that more than one virtual disk file may be present on each hypervisor. Virtual disk file 1023 may be, for example, VMWare images (.vmdk files), VirtualBox images (.vdi files), Virtual Hard Disk images (.vhd), and/or other image format files, including combinations thereof. Virtual disk file 1023 comprises a plurality of blocks A-F which together comprise one or more secondary storage volumes. In this example, blocks A-C comprise virtual drive 1024X and blocks D-F comprise virtual drive 1024Y. Virtual drive 1024X comprises a plurality of data items D1-D3. Likewise, virtual drive 1024Y comprises a plurality of data items D4-D6. As discussed, the data items may be files on the virtual drives such as, for example, cache files, ghost files, swap files, operating system files, regular files, and the like.

Typically, virtual disk file 1023 also includes a block mapping table. The block mapping table describes the storage on virtual disk file 1023. For example, the block mapping table may describe the correspondence between data items D1-D6 on virtual disk 1024X and 1024Y and the underlying virtual disk file 1023.

Data utility may 1040 may comprise any of a variety of applications or appliances. For example, data utility 1040 may be compliance software, security software, backup software, log analytics software, replication software, and/or patch management software.

In operation, data control system 1010 may first present itself to data utility 1040 over a network (LAN or WAN) as a shared disk. For example, data utility 1040 may see "P:\" (or a P-DRIVE). Data utility 1040 can then request to mount or map the P-DRIVE. In this example, in response to receiving the request to mount, data identification system 610 identifies processing elements, virtual processing elements, virtual storage elements, and contents of virtual storage elements and generates a file system view comprising the identified elements arranged in a hierarchical order. In this way, data control system 1010 emulates a physical drive by allowing the data utility to mount or map a drive to the elements and contents of storage environment 1020.

Once mounted or mapped, data control system 1010 provides the file system view to data utility 1040. Data utility may then access request access to the contents of virtual system environment 1020.

Figure 11:
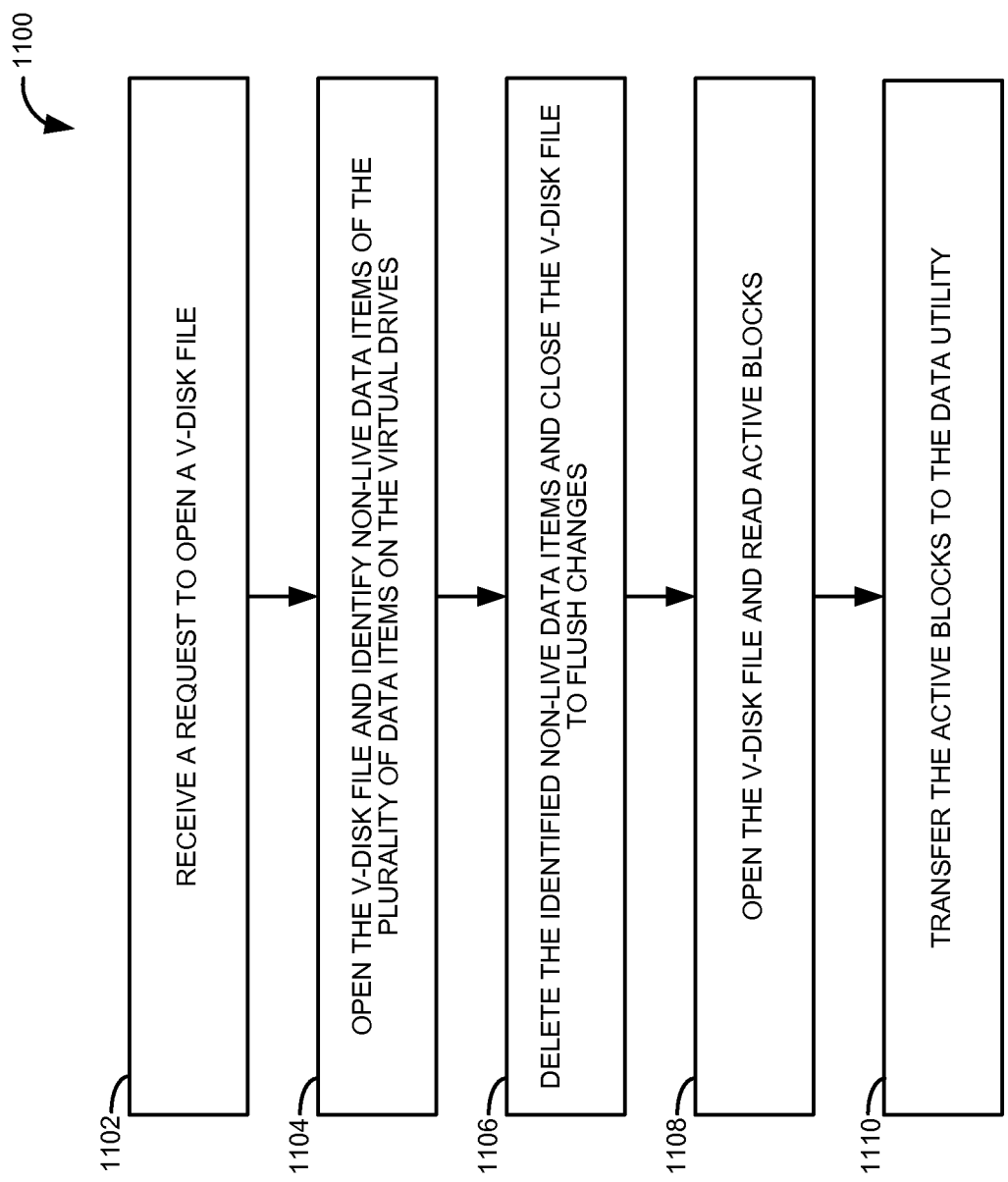
FIG. 11 illustrates an operation of a data control system in a data storage environment.

FIG. 11 illustrates process 1100 describing operation of data control system 1010 in virtual system environment 1000. More specifically, this example illustrates triggering pre-processing scripts in data control system 1010 to perform a series of operations to reduce the number of blocks that need to be read from virtual disk file 1023.

Those skilled in the art will appreciate that it is often necessary to do explicit operations on live data sources (e.g., virtual disk files in a virtual system environment) prior to accessing the data sources (e.g., for backup or other operations) in order to guarantee data consistency. In some cases, a live data source may be put into logging mode prior to copying the contents of the data source during the backup or other operation. Once the backup or other operation is complete, the data source must then be taken out of logging mode so that the log can be merged back into the database.

Typically, a data utility 1040 contains call out points that invoke pre- and post-processing scripts. These scripts are explicit operations controlled by data utility 1040. A pre-processing script is invoked prior to copying the data and a post-processing script is invoked after copying the data. However, rather than embedding the commands for invoking the pre- and post-processing scripts and the scripts themselves into the backup software, these commands and scripts can be embedded into data control system 1010. In this way, the pre-processing scripts can be invoked or triggered based on file open calls and post-processing scripts can be invoked or triggered based on file release calls. By embedding commands and scripts into a data control system, data utilities do not need to be modified for each data source that requires data consistency and content generation operations.

To begin, data control system 1010 receives a request to open a virtual disk file (Step 1102). In some examples, the data open request may be a file open request. For example, data control system 1010 may present itself to a data utility (not shown) over a network (LAN or WAN) as a shared disk. The data utility 1040 may then request to mount or map the drive in order to see information in virtual system environment 1020. When mounted or mapped, data control system 1010 may provides the file system view of virtual system environment 1020 to the data utility.

The request to open a virtual disk file may trigger one or more pre-processing scripts. For example, upon being presented the file system view including virtual disk file 1023, data utility 1040 transfers a request to open virtual disk file 1023. As discussed, the request to open a virtual disk file may be a request to read the contents of virtual disk file 1023. In this example, pre-processing scripts are triggered when data control system 1010 receives the virtual disk file open request. The pre-processing scripts direct data control system 1010 to open the virtual disk file and identify non-live data items of the plurality of data items on the virtual drives (Step 1104).

In this example, non-live data items are shown shaded. Data item D3 on virtual drive 1024X and data item D4 on virtual drive 1024Y are non-live data items. As discussed, these non-live data items may be, for example, cache files, ghost files, or swap files. The liveliness of the data items may be determined by accessing the metadata in a guest operating system. This is discussed in more detail with respect to FIG. 12.

Once the non-live data items are identified, data control system 1010 deletes the identified non-live data items in virtual drives 1024X and 1024Y and closes the virtual disk file to flush changes (Step 1106). Those skilled in the art will appreciate that deletion of the data items results in deletion of corresponding blocks in virtual disk file 1023. As discussed, the data source must be taken out of logging mode so that the log can be merged back into the database—resulting in the flush.

The pre-processing scripts then direct data control system 1010 to open virtual disk file 1023 again and read the active or "live" blocks (Step 1108) and transfer the active blocks to the data utility (Step 1110). When completed, data utility 1040 may transfer a file release call to data control system 1010 triggering the post-processing scripts which closes the virtual disk file and flushes the changes, if any.

Figure 12:
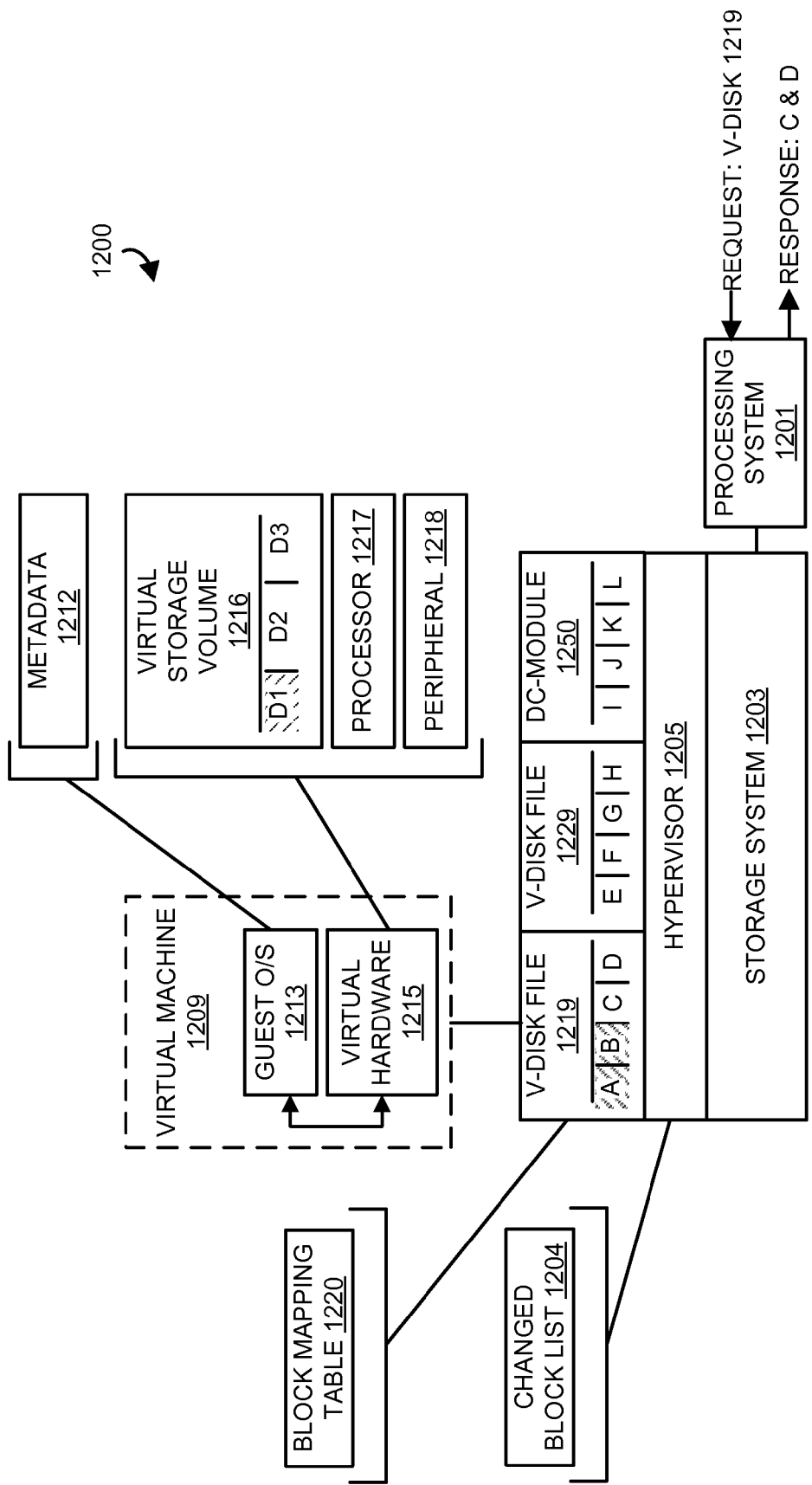
FIG. 12 illustrates a data control system in a virtual system environment.

FIG. 12 illustrates an embodiment wherein the data control system is embedded in a virtual system environment 1200. In this example, data control module 1250 operates to identify and delete non-live data items in a secondary storage volume in response to a data request. Virtual system environment 1200 includes processing system 1201, and storage system 1203. Hypervisor 1205 runs on storage system 1203. Virtual disk files 1219 and 1229 and DC module 1250 run on hypervisor 1205. As shown, DC module 1250 runs on hypervisor 1205. However, in some embodiments, DC module 1250 may run directly on storage system 1203, on another hypervisor (not shown) running on storage system 1203, and/or on another storage system (not shown). Although not shown in this example, those skilled in the art will appreciate that in some embodiments DC module 1250 may run on storage systems outside of virtual system environment 1200.

Hypervisor 1205 keeps track of those data blocks that have changed using a changed block list 1204. Changed block list 1204 describes the blocks that have changed in virtual disk files 1219 and 1229. In some example, hypervisor 1205 generates changed block list 1204. Those skilled in the art will appreciate that changed block list 1204 may alternatively or additionally be generated by any entity within virtual machine 1209 (such as guest operating system 1213), processing system 1201, and/or storage system 1203. Moreover, changed block list 1204 may be generated by replication software, continuous data protection (CDP) software, or virtual disk change block tracking software running on virtual machine 1209, hypervisor 1205, or processing system 1201.

Virtual disk files 1219 and 1229 may be, for example, VMWare images (.vmdk files), VirtualBox images (.vdi files), Virtual Hard Disk images (.vhd), and/or other image format files, including combinations thereof. Virtual disk files 1219 and 1229 include block mapping tables. Block mapping table 1220 describes the storage of the data volume in virtual disk file 1219. For example, block mapping table 1220 may describe the correspondence between data items (D1, D2, and D3) on virtual storage volume 1216 and underlying virtual disk file 1219.

As discussed, hypervisor 1205 includes virtual machines represented by v-disk files 1219 and 1229. In particular, v-disk file 1219 represents virtual machine 1209. Virtual machine 1209 includes guest operating system 1213 and virtual hardware 1215. Guest operating system 1213 includes metadata 1212. Virtual hardware 1215 includes virtual storage volume 1216, virtual processor 1217, and virtual peripheral 1218.

In operation, processing system 1201, executing software including DC module 1250, receives a request for a volume of data having a plurality of data blocks. In this example processing system 1201 receives a request for v-disk 1219. As shown, v-disk 1219 comprises data blocks A, B, C, and D. Processing system 1201 executing DC module 1250 opens the v-disk 1219 and accesses the guest O/S 1213 and/or metadata 1212 to determine which data items are non-live. In this example, data item D1 is shown shaded and thus, is non-live. Data item D1 is subsequently deleted and v-disk 1219 closed. Closing v-disk 1219 flushes the deleted data item D1, and thus blocks A and B which correspond to data item D1 are also deleted. As discussed, block mapping table 1220 identifies which blocks correspond to which data items in v-disk file 1219.

Processing system 1201, executing software including DC module 1250, then re-opens v-disk file 1219 and reads the active or live blocks. In this case, because blocks A and B have been deleted, only blocks C and D are read. Advantageously, the number of blocks needed to be read and transferred from virtual storage system 1200 is reduced.

Figure 13:
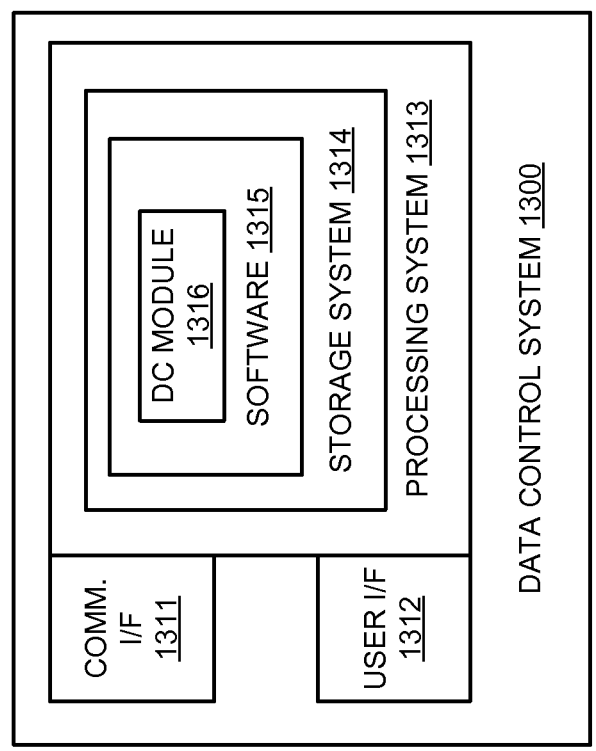
FIG. 13 illustrates a data control system in an exemplary embodiment.

FIG. 13 illustrates data control system 1300. Data control system 1300 provides an example of data control system 100 of FIG. 1, data control system 300 of FIG. 3, data control system 510 of FIG. 5, data control 810 of FIG. 8, data control system 1010 of FIG. 10, although systems 100, 300, 510, 810, and 1010 may use alternative configurations. Data control system 1300 includes processing system 1313, user interface 1312, and communication interface 1311. User interface 1312 may be excluded in some embodiments. Processing system 1313 includes storage system 1314. Storage system 1314 stores software 1315. Processing system 1313 is linked to user interface 1312 and communication interface 1311. Software 1315 includes data control (DC) module 1316. DC module 1316 provides an example of DC module 102 of FIG. 1, DC module 350 of FIG. 3, DC module 515 of FIG. 5, DC module 750 of FIG. 7, DC module 815 of FIG. 8, and DC module 1250 of FIG. 12, although DC modules 102, 350, 515, 750, 815, and 1250 may use alternative configurations.

Data control system 1300 could be comprised of a programmed general-purpose computer, although those skilled in the art will appreciate that programmable or special purpose circuitry and equipment may be used. Data control system 1300 may be distributed among multiple devices that together comprise elements 1311-1315.

Communication interface 1311 is configured to communicate with a storage environment including storage environment 820 and virtual system environment 1020. Additionally, communication interface 1311 may be configured to communicate with one or more data utility or other application which may, for example, mount or map data control system 1300 to access a storage environment.

Communication interface 1311 could comprise a network interface, modem, port, transceiver, or some other communication device. Communication interface 1311 may be distributed among multiple communication devices. Processing system 1313 could comprise a computer microprocessor, logic circuit, or some other processing device. Processing system 1313 may be distributed among multiple processing devices.

User interface 1312 could comprise a keyboard, mouse, voice recognition interface, microphone and speakers, graphical display, touch screen, or some other type of user device. User interface 1312 is configured to communicate with a system operator. As discussed, user interface 1312 may be omitted in some embodiments.

Storage system 1314 could comprise a disk, tape, integrated circuit, server, or some other memory device. Storage system 1314 may be distributed among multiple memory devices. Storage system 1314 includes software 1315. Software 1315 may include an operating system, logs, utilities, drivers, networking software, and other software typically loaded onto a computer system. Software 1315 could contain an application program, firmware, or some other form of computer-readable processing instructions. Software 1315 also includes DC module 1316. When executed by processing system 1313, DC module 1316 directs data control system 1300 to operate as described herein.

In some examples, DC module 1316 instructs processing system 1313 to direct communication interface 1311 to receive a request to retrieve data from a primary storage volume that includes a secondary storage volume. DC module 1316 further instructs processing system 1313 to direct storage system 1314 to store the primary storage volume that includes the secondary storage volume. DC module 1316 directs processing system 1313 to identify changed segments of a plurality of segments in the primary storage volume, and identify allocated segments of the changed segments. DC module 1316 instructs processing system 1313 to direct communication interface 1311 to transfer the allocated segments in response to the request.

In some examples, DC module 1316 instructs processing system 1313 to, in response to the request to retrieve the data from the primary storage volume, determine a subset of the plurality of data items that are not live based on the allocated segments of the changed segments identified in the primary storage volume, and execute an operation on the subset of the data items to reduce an amount of the plurality of blocks involved in retrieving the data. In some examples, in order to execute the operation on the subset of the data items DC module 1316 instructs processing system 1313 to delete each data item of the subset of the data items.

In some examples, DC module 1316 executed by processing system 1313 identifies qualified blocks of a plurality of data blocks responsive to receiving a request for a volume of data having a plurality of data blocks, filters the plurality of data blocks to construct a list of qualified blocks, and reads the list of qualified blocks from the first volume of data based on the list of qualified blocks.

In some examples, DC module 1316 executed by processing system 1313 may also read the remaining blocks (i.e., the non-qualified blocks) from a null block module such as, for example, a "/dev/zero" file that provides as many null characters (ASCII NUL, 0x00) as are read from it. Further, in some examples DC module 1316 executed by processing system 1313 could direct data control system 1300 to transfer a second volume of data comprising the qualified blocks read from the data volume and the null blocks provided from the null block module.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data control system, the method comprising:
   receiving a request to retrieve data from a primary storage volume;
   identifying changed segments of a plurality of segments in the primary storage volume;
   identifying allocated segments of the changed segments;
   determining a subset of the allocated segments of the changed segments that are not in use;
   executing an operation on the subset of the allocated segments of the changed segments to reduce an amount of the data retrieved from the primary storage volume; and
   transferring the allocated segments in response to the request.

2. The method of claim 1 further comprising generating a list of qualified blocks based on the allocated segments of the changed segments identified in the primary storage volume.

3. The method of claim 2 further comprising reading a plurality of data blocks from the primary storage volume based on the list of qualified blocks.

4. The method of claim 1 wherein the primary storage volume comprises a plurality of blocks corresponding to a plurality of data items in a secondary storage volume within the primary storage volume.

5. The method of claim 4 further comprising:
   determining a subset of the plurality of data items that are not live based on the allocated segments of the changed segments identified in the primary storage volume; and
   executing an operation on the subset of the data items to reduce an amount of the plurality of blocks involved in retrieving the data.

6. The method of claim 5 wherein executing the operation on the subset of the data items to reduce the amount of the plurality of blocks involved in retrieving the data comprises deleting each data item of the subset of the data items.

7. The method of claim 6 further comprising flushing changes to the secondary storage volume after deleting each data item of the subset of the data items.

8. The method of claim 1 wherein the primary storage volume includes a secondary storage volume stored thereon, and wherein identifying the allocated segments of the changed segments comprises identifying the allocated segments of the changed segments based on an allocation status of a plurality of data items contained in the secondary storage volume, wherein the plurality of data items correspond to the changed segments.

9. A data control system, the system comprising:
   a communication interface configured to receive a request to retrieve data from a primary storage volume that includes a secondary storage volume;
   a storage system configured to store the primary storage volume that includes the secondary storage volume;
   a processing system configured to identify changed segments of a plurality of segments in the primary storage volume, and identify allocated segments of the changed segments, determine a subset of the allocated segments of the changed segments that are not in use, and execute an operation on the subset of the allocated segments of the changed segments to reduce an amount of the data retrieved from the primary storage volume; and
   the communication interface further configured to transfer the allocated segments in response to the request.

10. The system of claim 9 wherein the processing system is further configured to generate a list of qualified blocks based on the allocated segments of the changed segments identified in the primary storage volume, and read a plurality of data blocks from the primary storage volume based on the list of qualified blocks.

11. The system of claim 9 wherein the primary storage volume comprises a plurality of blocks corresponding to a plurality of data items in a secondary storage volume within the primary storage volume.

12. The system of claim 11 wherein the processing system is further configured to determine a subset of the plurality of data items that are not live based on the allocated segments of the changed segments identified in the primary storage volume, and execute an operation on the subset of the data items to reduce an amount of the plurality of blocks involved in retrieving the data.

13. The system of claim 12 wherein the processing system configured to execute the operation on the subset of the data items to reduce the amount of the plurality of blocks involved in retrieving the data comprises the processing system configured to delete each data item of the subset of the data items.

14. The system of claim 9 wherein the processing system configured to identify the allocated segments of the changed segments comprises the processing system configured to identify the allocated segments of the changed segments based on an allocation status of a plurality of data items contained in the secondary storage volume, wherein the plurality of data items correspond to the changed segments.

15. One or more non-transitory computer-readable storage media having program instructions stored thereon for operating a data control system, wherein the program instructions, when executed by the data control system, direct the data control system to:
  receive a request to retrieve data from a primary storage volume;
  identify changed segments of a plurality of segments in the primary storage volume;
  identify allocated segments of the changed segments;
  determine a subset of the allocated segments of the changed segments that are not in use;
  execute an operation on the subset of the allocated segments of the changed segments to reduce an amount of the data retrieved from the primary storage volume; and
  transfer the allocated segments in response to the request.

16. The one or more non-transitory computer-readable storage media of claim 15 wherein the program instructions further direct the data control system to generate a list of qualified blocks based on the allocated segments of the changed segments identified in the primary storage volume, and read a plurality of data blocks from the primary storage volume based on the list of qualified blocks.

17. The one or more non-transitory computer-readable storage media of claim 15 wherein the primary storage volume comprises a plurality of blocks corresponding to a plurality of data items in a secondary storage volume within the primary storage volume.

18. The one or more non-transitory computer-readable storage media of claim 17 wherein the program instructions further direct the data control system to determine a subset of the plurality of data items that are not live based on the allocated segments of the changed segments identified in the primary storage volume, and execute an operation on the subset of the data items to reduce an amount of the plurality of blocks involved in retrieving the data.

19. The one or more non-transitory computer-readable storage media of claim 18 wherein the program instructions, in order to direct the data control system to execute the operation on the subset of the data items to reduce the amount of the plurality of blocks involved in retrieving the data, instructs the data control system to delete each data item of the subset of the data items.

20. The one or more non-transitory computer-readable storage media of claim 19 wherein the program instructions, in order to direct the data control system to identify the allocated segments of the changed segments, instructs the data control system to identify the allocated segments of the changed segments based on an allocation status of a plurality of data items contained in the secondary storage volume, wherein the plurality of data items correspond to the changed segments.

* * * * *